INVENTORS,
Carl G. Harbordt,
BY Bern F. Buff.
Hamilton & Hamilton,
Attorneys.

April 5, 1960     C. G. HARBORDT ET AL     2,931,059
SAMPLING AND BUMPING DEVICE FOR HEATED ZINC RETORTS
Filed April 4, 1956
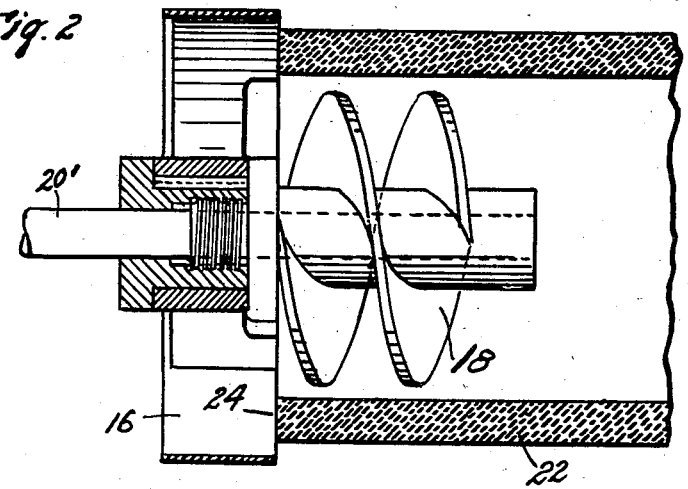
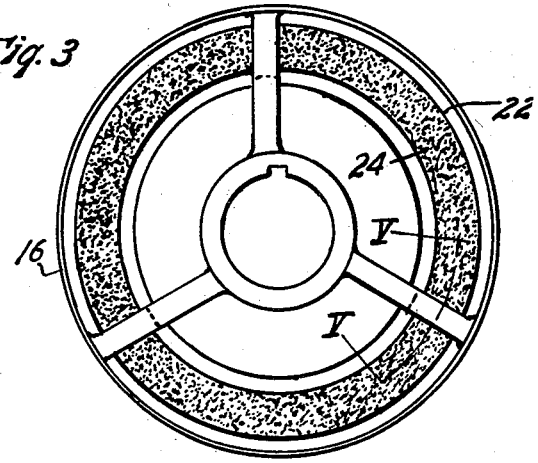
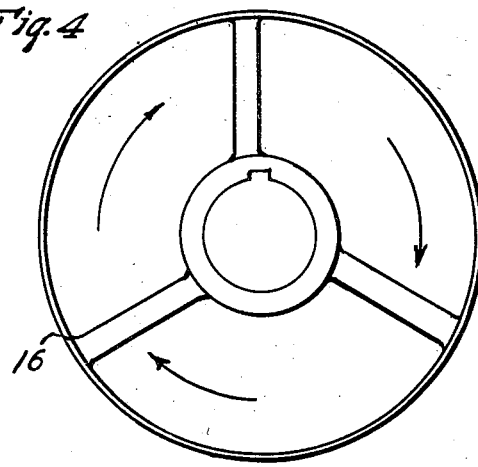
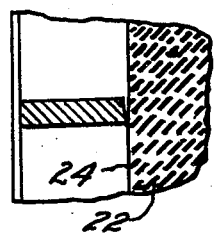
INVENTORS,
Carl G. Harbordt,
BY Bern F. Buff.
Hamilton & Hamilton,
Attorneys.

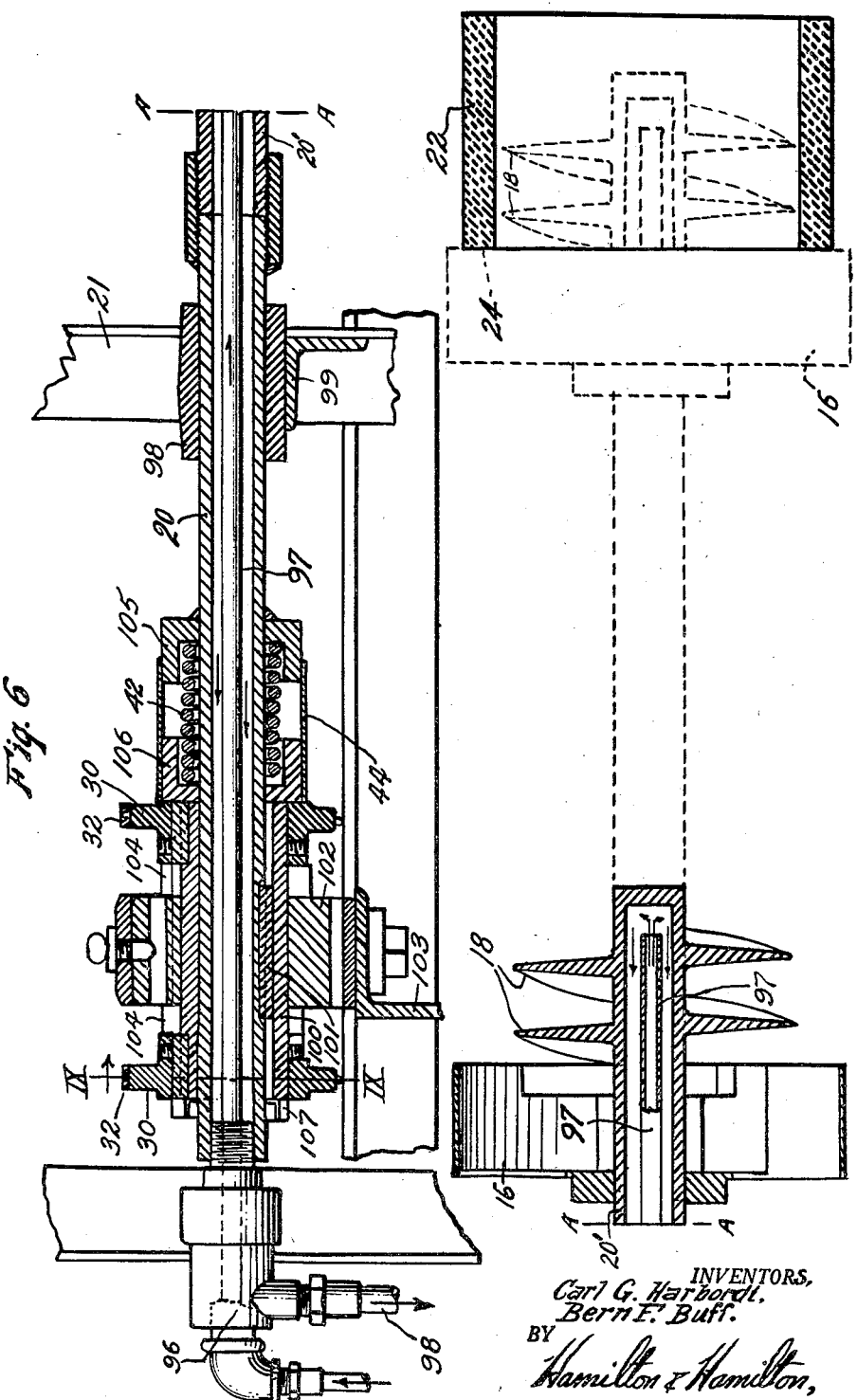

April 5, 1960    C. G. HARBORDT ET AL    2,931,059
SAMPLING AND BUMPING DEVICE FOR HEATED ZINC RETORTS
Filed April 4, 1956    6 Sheets-Sheet 4

INVENTORS,
Carl G. Harbordt,
Bern F. Buff.
BY Hamilton & Hamilton,
Attorneys.

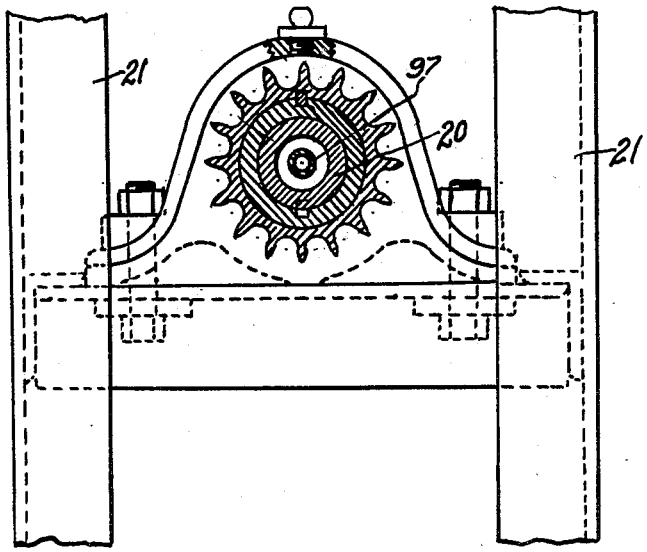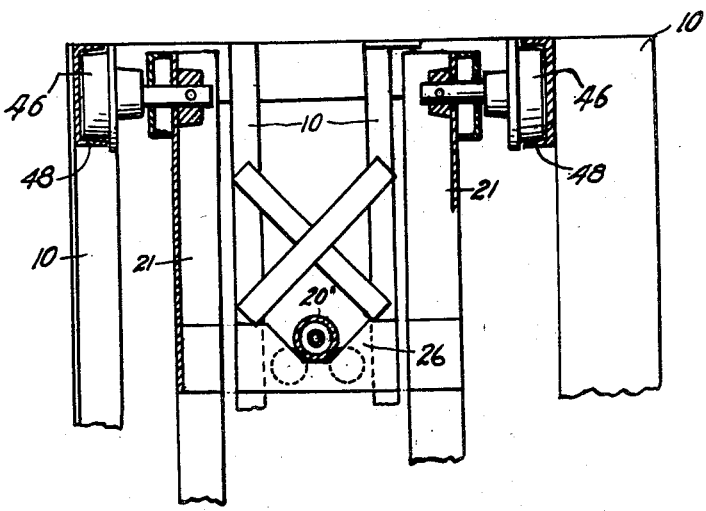

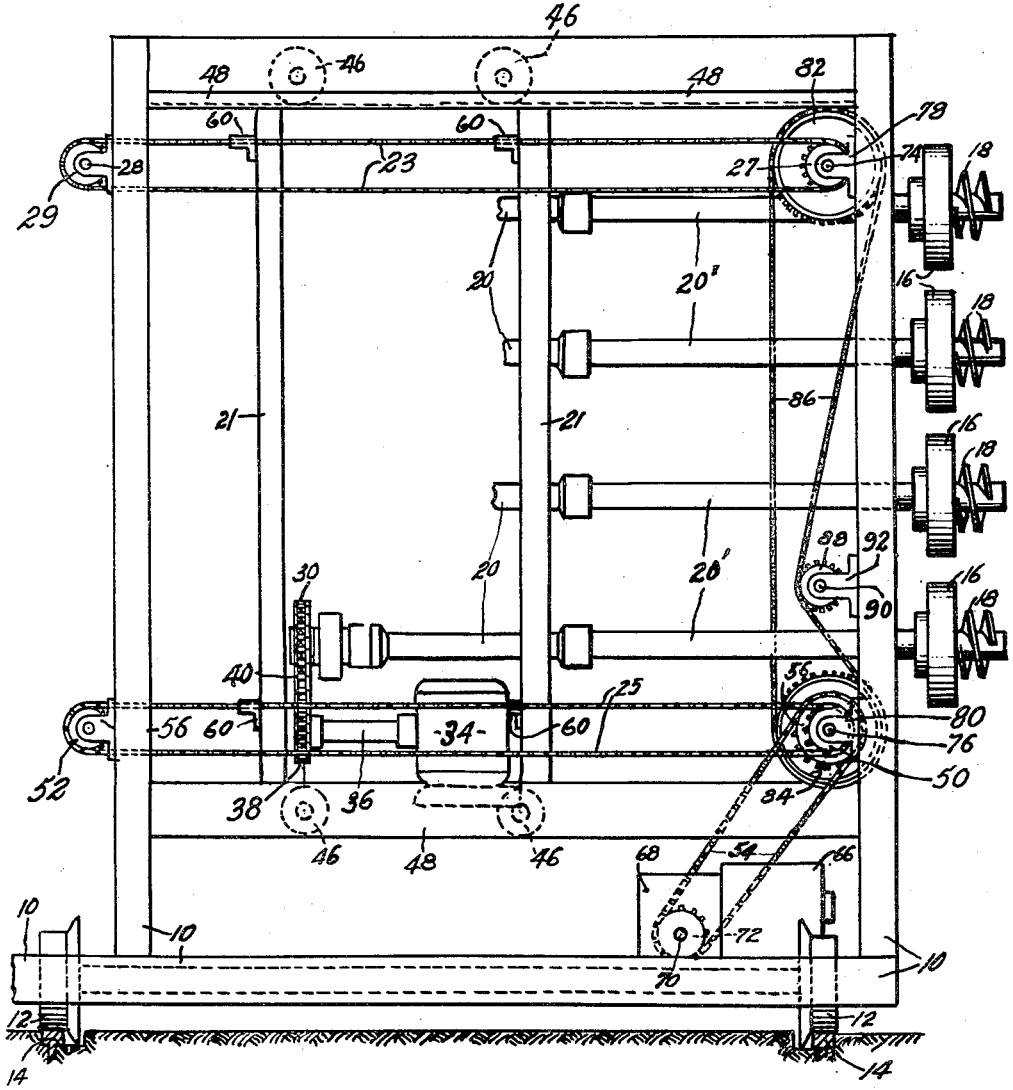

United States Patent Office 2,931,059
Patented Apr. 5, 1960

2,931,059

SAMPLING AND BUMPING DEVICE FOR HEATED ZINC RETORTS

Carl G. Harbordt and Bern F. Buff, Bartlesville, Okla.

Application April 4, 1956, Serial No. 576,080

3 Claims. (Cl. 15—104.1)

This invention relates to improvements in sampling and bumping devices for zinc smelting furnaces. In the process of zinc smelting, a prepared mix of oxidized zinc bearing material and a reducing material is charged into a plurality of hollow tubes arranged in a heating furnace so that the products of combustion can freely circulate around them. These tubes, generally known as retorts, have one end closed and the other open, where the closed end rests on a shelf provided for in the center wall, and the open end rests on a front plate supported by a series of buckstays. Ordinarily the buckstays support a tier of pairs of retorts making up the tier of rows in the furnace. Furnaces of various lengths may be constructed, with retorts in a substantially horizontal and parallel position, an average size having fifty retorts in a row, in tiers of four, making 200 in all.

The open end of retort at the furnace front is arranged so that it can be connected to a small conical tube which serves to condense zinc vapors produced by heating the charge in the retorts. This tube, known as a condenser, has one end shaped to fit into the retort end, and the joint between the two is sealed by means of a luting material. When the charge has been heated for the required period of time, the zinc is substantially all distilled out of the retort, except at the joint area between retort and condenser where the zinc content remains relatively high. There remains a residue in the retort which has to be removed before a new charge is put in. Before the residue can be removed the condenser has to be separated from the retort, and it is customary to clean from the open end of the retort the accumulated crusts and accretions formed at it, and remove from the area at the open end the residue relatively high in zinc. These two operations are normally performed by means of tools and customarily termed, "bumping and sampling."

Because of the fact that the open end, or mouth of the retort, is ordinarily at a temperature of 2000 degrees Fahrenheit, and that several are open in the space where the bumping and sampling operations are to be performed, together with the fact that a dense fog of zinc oxide and dust-laden air results from these cleaning operations, the manual task is an arduous and hazardous one.

Bumping is the operation where the mouth of the retort is cleaned free from the accumulations of crusts and accretions, for proper replacement of condensers. This is customarily done with a bumping hand tool, or chisel. The material at the open end of retort, rich in zinc, is in a form requiring recharging for the recovery of the metal. The removal of this portion of the residue is termed the "sampling operation," and is customarily done with small scrapers.

The object of this invention is to provide a combination mechanically operated bumping and sampling device, by means of which one or more retorts are bumped and sampled in one operation, with the position of the operator remote from the heat, fumes, and dust. A further object of this invention is to make the operation less hazardous, increase the efficiency, provide economy, and attain a uniformity of action.

With this device the bumping is effected by means of rotating scrapers mounted to engage the rim of the retort mouth, and the sampling by tools arranged in spiral form so that the material to be recharged will be conveyed out, and through their scraping action, also remove the dam which tends to form at the open end. The combination bumping and sampling tool is limited in the pressure it can exert against the retort by means of a helical compression spring, and tools are kept cool by means of the circulating water through the hollow shafts.

Due to the fact that all of the retorts in the furnace are positioned in a regularly spaced parallel horizontal relation, it will be evident that any number of retorts in a vertical tier may be sampled and bumped simultaneously, or a sufficient number of tools can be provided to simultaneously bump and sample all of the retorts making up a tier of pairs of retorts, or, for that matter, any other arrangement of tools; which, by providing the horizontal and vetrical movement along the furnace length, will bump and sample all retorts in the furnace. Other objects of the invention are to provide a rapid means, an economical means, with efficiency and ease of operation, and adaptability for use with a plurality of retorts disposed in substantially parallel horizontal relation.

Reference will now be had to the drawings wherein:

Fig. 2 is an enlarged sectional view taken on line II—II of Fig. 1 with the parts shown in solid lines.

Fig. 3 is a face view of the structure shown in Fig. 2 and with some parts removed.

Fig. 4 is a face view of the bumper tool separated from the other parts and with arrows to indicate the direction of rotation.

Fig. 5 is a sectional view taken on line V—V of Fig. 3.

Fig. 6 is an enlarged longitudinal sectional view through the vertical line of one of the sampler and bumper units shown in Fig. 1 and separated at line A—A and offset on the sheet to facilitate proper showing.

Fig. 8 is an enlarged elevational view of upper end portions of the main frame and the transverse frame.

Fig. 9 is a sectional view taken on line IX—IX of Fig. 6 with parts broken away.

Fig. 10 is a diagrammatic elevational view of sampling and bumping device showing reversible driving motor whereby the frame 21 is driven axially relative to the retorts and with parts broken away.

Figure 1:
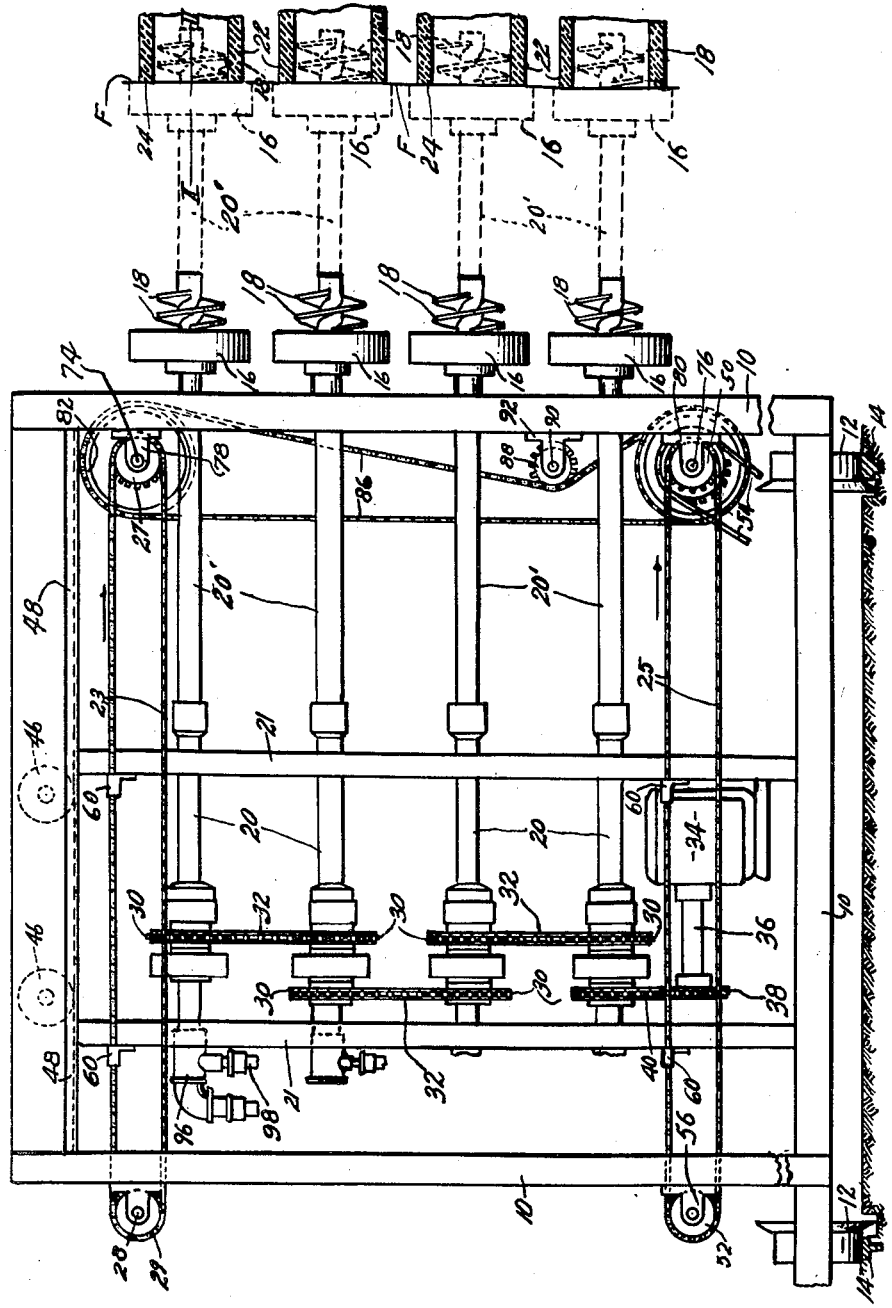
Fig. 1 is a diagrammatical elevational view of sampling and bumping device for heated zinc ore retorts, with parts shown in dotted lines in the extended position to operate on the retorts within the furnace, also, the height of this view has been foreshortened.

Throughout the several views similar parts are indicated by like numerals and the numeral 10 designates a frame adapted to carry the bumping and sampling tools with means for driving them. This frame is mounted on wheels 12 which are operatively mounted on rails 14 disposed in parallel relation in front of a zinc smelting furnace F for positioning said tools in alignment with successive vertical rows of retorts in said furnace.

The bumper tool 16 and sampler auger 18 are carried on the extended end portion 20′ of rotatable shaft 20, with the auger 18 positioned in front of the bumper tool 16 as shown in Fig. 2. It will be noted that the retorts 22 are shown in equally spaced apart parallel relation. While four retorts are shown to the vertical row, yet it is apparent that this number may be increased or decreased without varying the general relation of the parts in the unitary tool as shown to the respective retorts.

Figure 7:
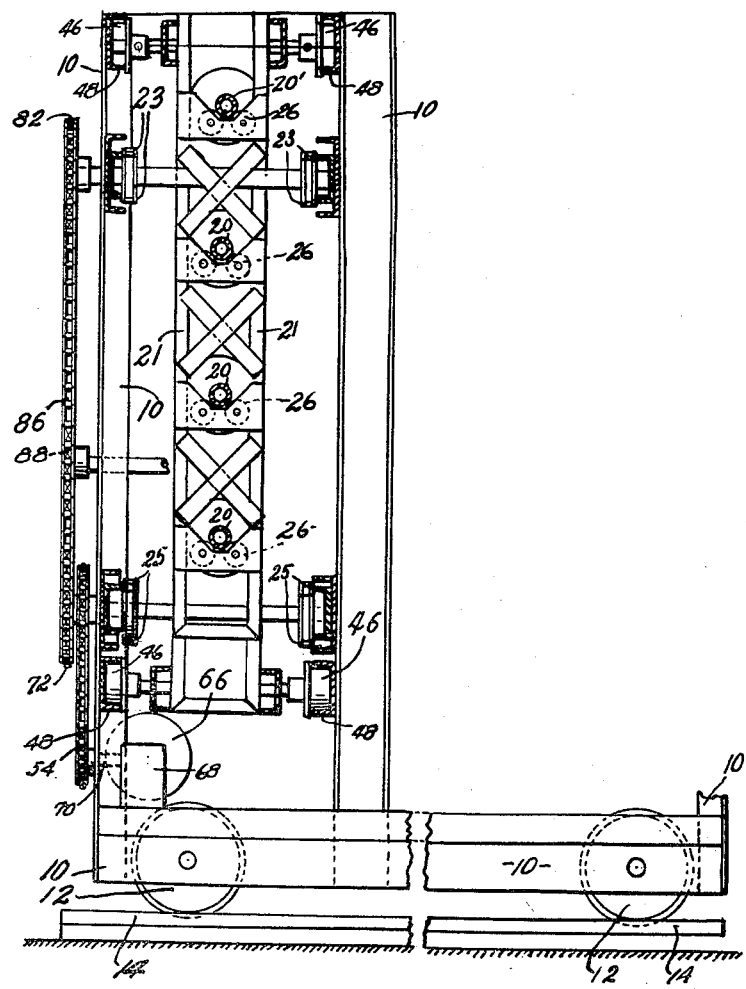
Fig. 7 is a rear end view of the device with parts broken away to better disclose the structure.

This frame 10 is longitudinally adjustable so that when the series of tools are moved along rails 14 to axially register with retorts 22, then the frame 21 may be moved transversely of said rails 14 to cause powered tools 16 and 18 to clean and sample the adjacent retorts shown in Fig. 1 with the sampling auger positioned a few inches into the end portion of the adjacent retort and with the bumper tool 16 contacting the outer end wall 24 of the retort 22 whereby it is thoroughly cleaned for recharging. Referring to Fig. 7 it will be noted that rotatably mounted drive tube 20' carrying operating tools 16 and 18 is carried in cradles 26 carried by longitudinally movable frame 21 which is adapted to be moved axially relative to said adjacent retorts for servicing the said retorts.

The bumping tool 16 and sampling tool 18 are operatively mounted on a frame 21 which is mounted for transverse movements on frame 10. This frame 21 is suspended on wheels 46 which rest in tracks 48 securely mounted on frame 10 so that the bumping and sampling tools may be moved at right angles to the movement of the frame 10 toward and from the retorts 22 for the cleaning (bumping) and sampling operations.

It will be noted that the retorts 22 are shown in aligned vertical rows in equally spaced apart parallel and horizontal relation. The number of retorts in each vertical row is shown as four. However, this might be varied without varying the general relation of the parts in the unitary tool as shown to the respective retorts.

Referring to Fig. 7 it will be noted that the hollow shaft 20 is mounted for rotation in frame 21. Connected to each shaft 20 is a tubular member 20' which carries the tools 16 and 18. This member 20' is carried in cradle 26 to simultaneously bump and sample the spaced apart vertical row of retorts 22. When these rotating tools 16 and 18 are so moved the auger 18 will be fed into the respective retort 22 so that when the tools are retracted the bumper will move from contact with retort end wall 24 and the auger 18 will be moved from the retort and drag a sample of the residue from the retort and it will be delivered into a hopper (not shown) for use to recharge the retorts for further smelting.

This sampling and bumping operation is to reclaim most of the high values ores from the retorts and to put the retorts in proper condition for recharging. Adjacent rotary tubes 20 are provided with fixed sprocket wheels 30. These sprocket wheels 30 are operatively joined together by means of chains 32 whereby as the drive motor 34 is energized all the drive tubes will simultaneously rotate in the same direction. Motor 34 has a drive shaft 36 which has a fixed sprocket wheel 38 operatively connected with the adjacent tube 20 by means of sprocket chain 40. Reference will now be had to Fig. 6 wherein is shown in detail the rotatable tube 20 and its associated parts which include a compressible helical spring 42 mounted in a tube 44 in coaxial relation with tube 20.

Referring in detail to Fig. 6, it will be seen that tube 20 is supported for rotation and axial sliding movement in a bushing 98 disposed at the forward face of frame 21 and fixed to a cross-member 99 of said frame. Rearwardly from bushing 98, tube 20 is supported for axial sliding movement in a sleeve 100, but is secured against rotation in said sleeve by a key 101. Sleeve 100 is rotatably mounted in a bearing 102 fixed to a cross member 103 of frame 21. The two sprocket wheels 30 associated with tube 20 are fixed rigidly on sleeve 100, respectively forwardly and rearwardly of bearing 102. Spacers 104 interposed between bearing 102 and sprockets 30 prevent axial movement of sleeve 100 in bearing 102. Chains 32 trained about the sprocket wheels 30 are operatively connected respectively to the corresponding sprocket wheels of the tubes 20 above and below the tube 20 illustrated in Fig. 6. A socket member 105 is welded or otherwise fixed on tube 20 forwardly of sleeve 100, and compression spring 42 is contained between socket 105 and a second socket member 106 which abuts the forward end of sleeve 100 and may be fixed to said sleeve to rotate therewith, but through which tube 20 is axially slidable. Thus tube 20 may be moved rearwardly against the yielding pressure of spring 42 by the force of the retort against the bumping and sampling tool carried by said tube, as frame 21 is advanced to cause said tools to engage the retort. Forward movement of tube 20 is limited by a collar 107 fixed thereon at the rearward end of sleeve 100.

The frame 21 is carried by endless chains 23 disposed adjacent the top of said frame and by chains 25 disposed at the bottom of said frame. The upper reach of each chain 23 travels in the direction indicated by the arrow while the lower reach thereof travels in the opposite direction. Chain 23 is trained over sprocket wheels 27 and 29 mounted for rotation with shafts 74 and 28 respectively, which are carried by frame 10.

Referring to Fig. 10, it will be noted that a reversible motor 66 is positioned adjacent the bottom of frame 10 and has a transmission 68 provided with drive shaft 70 to which is fixed a sprocket wheel 72. A sprocket chain 54 is operatively trained about sprocket wheel 72 and sprocket wheel 56 fixed to shaft 76 (journalled in brackets 80 at right in Fig. 10) serves to drive shaft 76 which in turn by means of fixed sprocket wheel 50 serves to drive chains 25 which are operatively mounted on idler sprocket wheels 52 carried by brackets 56 (at left in Fig. 10) whereby chains 25 are carried in a substantially horizontal path. The upper reaches of chains 23 and 25 engage brackets 60 fixed to frame 21 whereby tools 16 and 18 are first driven outwardly as shown in Fig. 1 to simultaneously bump and sample all the heated zinc furnace retorts disposed in a vertical row and the motor 66 is then reversed to move tools 16 and 18 from retorts 22 whereby the tool 16 will move away from the end 24 of the retorts and sample of the residue in each retort will be dragged from the retorts by auger 18 and deposited in a chamber (not shown) for resmelting. This operation of bumping and sampling is repeated at each of the vertical rows of the heated retort until all are cleaned and sampled for recharging. Operating chain 86 is operatively trained around sprocket wheels 82 and 84 to drive shafts 74 and 76 which in turn respectively drives chains 23 and 25. An adjustable sprocket wheel 88 fixed to shaft 90 is rotatably mounted in bracket 92 and is adjustable whereby the tension of drive chain 66 may be regulated.

Reference will now be had to Figs. 1, 7, 8 and 10 wherein the transverse frame 21 is best shown. The frame 21 is provided at its upper extremity with a pair of securely mounted rollers 46 which are mounted to freely travel in horizontal channel iron tracks 48 carried adjacent the top of frame 10. A similar pair of rollers and a track are also provided at the lower extremity of frame 21 to properly position the frame at all times during the transverse bumping and sampling operations.

Referring to Fig. 6 it will be noted that hollow shaft 20 has a head fitting 96 whereby an inlet water pipe 97 is mounted centrally in hollow shaft 20 to extend substantially the full length of said shaft whereby water is delivered to the sampling auger 18 for cooling the tools used in sampling and bumping the retorts 22. The exhaust returns through hollow shaft 20 around water pipe 97 to exhaust through outlet 98, this is a continuous cooling operation which may be regulated by varying the supply of water fed to the pipe 97.

What we claim as new and desire to protect by Letters Patent is:

1. A combination sampling and bumping device mounted for rotatable action with a driven shaft, said device comprising a bumping tool mounted adjacent the end portion of said shaft and having radially disposed blades adapted to scrape and clean the outer end of a retort, a sampling auger carried by said shaft in front of said bumper and adapted to be inserted into said retort to remove a portion of residue from said retort, and spring means associated with said shaft operable to maintain pressure between said bumper blades and the end of said retort.

2. A sampling and bumping device mounted for rotatable action with a driven tubular shaft, said device comprising a bumping tool mounted adjacent to the end portion of said tubular shaft and having radially disposed blades adapted to scrape and clean the outer end of a retort, a sampling auger carried by said hollow shaft in front of said bumper and adapted to be inserted into said retort to remove a position of residue from said retort, and spring means associated with said tubular shaft operable to maintain pressure between said bumper blades and the end of said retort, and a water circulating means associated with said bumping tool and sampling auger whereby they are cooled as they are used.

3. A sampling and bumping device for use in connection with a tubular retort open at one end, said device comprising a frame adapted to be positioned adjacent said retort, a shaft carried rotatably by said frame for coaxial relation to said retort, means carried by said frame and operable both to rotate said shaft about its axis and to move said shaft longitudinally toward and from the open end of said retort, a sampling tool comprising an auger affixed axially to the forward end of said shaft and operable to enter the open end portion of said retort to remove a portion of residue therefrom, a bumping tool affixed to said shaft just behind said auger and comprising a plurality of angularly spaced blades extending radially from said shaft to a diameter greater than that of said auger, the cutting edges of said blades lying in a plane at right angles to the axis of said shaft whereby to engage and face the open end of said retort, and to limit the insertion of said auger into said retort, the spaces intermediate said blades being open longitudinally of said shaft whereby residue removed by said auger will be discharged between said blades, and resilient means carried by said frame and operable to urge said shaft yieldably toward said retort, whereby to maintain cutting pressure of said blades against said retort.

References Cited in the file of this patent

UNITED STATES PATENTS

| | | |
|---|---|---|
| 365,247 | Elliott | June 21, 1887 |
| 1,109,533 | Keith | Sept. 1, 1914 |
| 1,268,911 | Ziesing et al. | June 11, 1918 |
| 1,837,484 | Reimer | Dec. 22, 1931 |
| 2,001,881 | MacMichael | May 21, 1935 |
| 2,196,260 | Gatto | Apr. 9, 1940 |
| 2,285,298 | Morrison | June 2, 1942 |
| 2,345,603 | Houdry et al. | Apr. 4, 1944 |